3,405,107
USE OF AMINE N-OXIDE AS A REGULATOR OF MOLECULAR WEIGHT IN ETHYLENE-PROPYLENE COPOLYMERIZATION WITH SOLUBLE CATALYST COMPRISING VANADIUM OXYTRICHLORIDE AND ALKYL ALUMINUM SESQUICHLORIDE
Demetreos N. Matthews, Bloomfield, and Robert J. Kelly, Montville, N.J., assignors to Uniroyal, Inc., a corporation of New Jersey
No Drawing. Filed Apr. 8, 1964, Ser. No. 358,371
10 Claims. (Cl. 260—88.2)

This invention relates ot the preparation of ethylene-propylene interpolymer rubbers, and more particularly it relates to the regulation of the molecular weight of such rubbers with the aid of amine N-oxides.

Synthetic, rubbery ethylene-propylene interpolymers are important and valuable materials, especially the unsaturated, terpolymeric, sulfur-vulcanizable forms of such interpolymers containing copolymerized therein a non-conjugated diene in addition to the ethylene and propylene. The invention is concerned with an improvement in a highly preferred method of making such terpolymers in solution, using a soluble catalyst based on an alkyl aluminum sesquichloride ($R_3Al_2Cl_3$) and vanadium oxytrichloride as disclosed in Belgian Patent 622,040, Sept. 3, 1962, United States Rubber Company. While such a catalyst system has many advantages, nevertheless it has been desirable to improve still further the polymerization method. In particular, it has been desirable to provide a way of regulating the molecular weight of the polymer, so that an easily processable material of lower molecular weight can be obtained. While it is possible to keep the molecular weight of the polymer down to a level where the processability is good by using excess catalyst, this is not desirable in commercial practice if for no other reason than economy. The present invention is accordingly directed to an improved way of regulating the molecular weight which does not require the use of high catalyst concentrations, and which in fact permits the use of remarkably low concentrations of catalyst. Such low concentrations of catalyst, if used in the conventional way, would lead to undesirably high molecular weight polymer that would in fact tend to precipitate out of the polymerization reaction medium and cause great difficulties.

In accordance with the invention, it has surprisingly been found that amine N-oxides are capable of regulating the solution interpolymerization of ethylene and propylene by a soluble catalyst system based on an alkylaluminum sesquichloride and vanadium oxytrichloride. So effective are the amine N-oxides for this purpose that interpolymers of a wide range of molecular weights, ranging from rubbers down to near liquids or liquids, can be prepared without resorting to the use of excessive amounts of catalyst.

It is to be emphasized that the catalyst system employed in the invention is of the soluble kind (i.e., soluble in the monomers and/or in the usual solvents used as polymerization media, e.g. hexane), as distinguished from insoluble or heterogeneous catalysts. The solubility of the presently employed catalyst is a consequence of the particular ingredients employed, and their proportions, specifically the relatively high ratio of the aluminum compound to the vanadium compound. The molar ratio of aluminum to vanadium is at least 5:1, and preferably at least 10:1; higher ratios such as 20:1, 35:1, 50:1, or even higher, may also be used. If desired, very high ratios of aluminum to vanadium (e.g. 200:1 or higher) may be employed, especially in those cases where the concentration of vanadium compound is very small. The alkylaluminum sesquichloride that forms the catalyst system along with the vanadium oxytrichloride is frequently ethylaluminum sesquichloride, although other alkylaluminum sesquichlorides may be used, including those in which the alkyl group has from 1 to 8 carbon atoms (preferably 1 to 4 carbon atoms). The sesquichloride can be provided in any conventional manner, for example by reacting dialkylaluminum monochloride ($R_2AlCl$) with monoalkylaluminum dichloride ($RAlCl_2$) in equimolar proportions so as to produce the sesquichloride ($R_3Al_2Cl_3$), or at least reacting them in such proportions as to produce a substantial content of sesquichloride.

The presently employed soluble catalyst behaves quite differently from an insoluble catalyst. Thus, the presently employed soluble catalyst is not an effective anionic coordination catalyst for propylene itself (only a very little yield is obtained, by cationic mechanism), nor for higher alpha-olefins (although it will interpolymerize propylene with ethylene). On the other hand, insoluble or heterogeneous catalysts (even those based on alkylaluminum halide and vanadium compounds) will polymerize propylene or higher olefins but are not well adapted for interpolymerization of ethylene with propylene. Such heterogeneous catalysts suffer from the disadvantage of being incapable of introducing a diolefinic component randomly into the interpolymer, unlike the present soluble catalyst. Random distribution of the diene is necessary for good vulcanization characteristics. It is important to keep this distinction in mind, because amine N-oxides behave quite differently in the present soluble catalyst system as opposed to their behavior in an insoluble, heterogeneous catalyst system. Thus, in Belgian Patent 608,467 issued to Badische Anilin, Sept. 22, 1961, certain nitrogen-containing chemicals, including amine oxides, are used along with a catalyst capable of homopolymerizing propylene and higher alpha-olefins; the purpose of the nitrogen-containing chemical in such a system is to increase the amount of polymer insoluble in boiling hexane—that is, to increase the crystallinity. It will be apparent to a person skilled in this art that such an effect—increasing the crystallinity—would be highly undesirable when preparing a rubbery polymer, which is of course amorphous rather than crystalline. Furthermore, the use of the nitrogen-containing chemical in the Belgian patent tends to increase the molecular weight of the polymer. Again, this is of course directly contrary to the object sought by the present invention. The present invention is based on the surprising discovery that amine oxides in the present catalyst (which, unlike the catalyst of Belgian Patent 608,467, is not an effective catalyst for the preparation of crystalline homopolymer from propylene or higher alpha-olefins) produce, in the copolymerization of ethylene and propylene, a highly desirable effect which is unlike the effect produced by amine oxides in the homopolymerization of propylene and higher alpha-olefins with catalysts which are capable of making crystalline homopolymer from propylene and higher olefins, in accordance with Belgian Patent 608,467.

Any amine N-oxide may be employed in the present invention. It is preferable, however, that it be soluble in the polymerization solvent. There may be mentioned, by way of non-limiting example, the heterocyclic nitrogen base N-oxides, e.g. pyridine N-oxide, picoline N-oxide, collidine N-oxide, and the like; trialkylamine N-oxides, e.g., diethyldodecylamine N-oxide, and the like; dialkylarylamine N-oxides, e.g., N,N-dimethylaniline N-oxide, N,N-diethylaniline N-oxide, and the like.

The amine N-oxides are extremely effective as polymerization regulators in the presently described system, even in minute amount. The amount of amine N-oxide employed is not critical. Surprisingly small amounts of the N-oxide, e.g., about 0.1 mole of N-oxide per mole of vanadium compound, are sufficient in many cases to produce a noticeable regulating effect. Usually it is preferred to use somewhat larger amounts, typically 1–10 moles of the N-oxide per mole of vanadium, but it will be understood that considerably more N-oxide than this may be employed if desired. Ordinarily there is little or no proportionate added advantage, as far as regulating effect is concerned, in using appreciably more than about 10 moles of the N-oxide, and for reasons of economy we generally do not use more than this amount. Amounts of N-oxide as high as about 20 moles, or even more, per mole of vanadium, can be employed, but ordinarily such large amounts would be avoided as unnecessary if not wasteful. In any case, the molar amount of N-oxide does not exceed the molar amount of the alkylaluminum sesquichloride. In general, the more N-oxide that is used, the lower is the viscosity (molecular weight) of the resulting interpolymer. The optimum amount of N-oxide in any given case will depend upon the molecular weight desired in the polymer, and/or the particular N-oxide used, as well as on the exact polymerization procedure.

More than one amine N-oxide may be used if desired. The N-oxide may all be introduced at the start, or preferably it is introduced continuously or in increments as the polymerization proceeds (especially if the catalyst ingredients are introduced incrementally).

In the practice of the invention the catalyst ingredients, i.e., the alkylaluminum sesquichloride and vanadium oxytrichloride, are combined in the presence of at least a portion of the monomers, since the best yields are obtained in this way. The amine N-oxide is added immediately after the catalyst ingredients have been combined in the presence of the monomers, or simultaneously with the catalyst ingredients. (In Belgian Patent 608,467 the pyridine N-oxide is mixed with the transition metal compound prior to addition of the aluminum compound; this would be an undesirable sequence for the present purposes.)

As indicated, a preferred practice of the invention contemplates the production of unsaturated, sulfur-vulcanizable, rubbery terpolymers of ethylene, propylene and a non-conjugated diene such as dicyclopentadiene, methylcyclopentadiene dimer, 1,4-hexadiene, 11-ethyl-1,11-tridecadiene, 1,9-octadecadiene, 1,5-cyclooctadiene, or other suitable copolymerizable dienes such as are disclosed in British Patent 880,904 of Dunlop Rubber Company, Oct. 25, 1961; U.S. Patents 2,933,480, Gresham and Hunt, Apr. 19, 1960 and 3,000,866, Tarney, Sept. 19, 1961; and Belgian Patents 623,698 and 623,741 of Montecatini, Feb. 14, 1963, the disclosures of which are hereby incorporated herein by reference. Preferred terpolymers contain from about 1 to about 25% (more preferably about 2 to about 15%) by weight of dicyclopentadiene or the like; the remaining portion of the terpolymer contains from about 30% to about 80%, by weight, of propylene, the remainder being ethylene.

The process is conveniently carried out in a solvent, although an added solvent is not essential; the monomers being polymerized can serve as the solvent. In general, the normal solvents for coordination ionic polymerization can be used. These include the aromatic hydrocarbons, aliphatic hydrocarbons, chlorobenzene, tetrachloroethylene, and any other solvents which will not destroy the catalyst. Furthermore, the procedure may otherwise be the same as in conventional practice as far as such details as temperature of polymerization, pressure, concentration of catalyst, and the like, are concerned (see, for example, British Patent 886,368, Jan. 3, 1962 or Belgium Patent 622,040, Sept. 3, 1962, United States Rubber Company).

One preferred practice of the invention contemplates continuously performing the steps of (1) interpolymerizing ethylene, propylene and a diene such as dicyclopentadiene—for example, by introducing the mixture of monomers into a first polymerization zone wherein it is combined with at least a portion of each of the catalyst ingredients, and (2) withdrawing a stream containing at least a portion of terpolymer from said zone, and (3) repeating steps (1) and (2) in one or more subsequent polymerization zones, into which the reaction stream withdrawn from the previous polymerization zone is introduced successively. There may be introduced incrementally or continuously into each zone more of the primary catalyst ingredients, particularly the vanadium compound and/or the amine N-oxide, as required, to maintain the system at peak efficiency consistent with economical utilization of catalyst. More of one or more of the monomers may be introduced in such subsequent reaction zones, if desired. The stream issuing from the final reaction zone, in the form of a thick solution or cement, may be processed in the usual ways to separate the polymer and remove catalyst residues.

The following examples will serve to illustrate the practice of the invention in more detail.

EXAMPLE I

A. Use of pyridine N-oxide as MW Regulator. An interpolymer of ethylene, propylene, and dicyclopentadiene was prepared in a five-gallon pressurized reactor equipped with a stirrer. The dried reactor was loaded in an atmosphere of dry nitrogen with 13.3 kg. of benzene purified by percolation through activated silica gel. After evacuation of the reactor 30 g. of purified dicyclopentadiene was added, followed by approximately 3.0 pounds of propylene. Ethylene was then charged in to an equilibrium total pressure of 45 p.s.i.g. (requiring 2 lbs. of ethylene). Upon addition of 0.11 mole of $Et_3Al_2Cl_3$ in a 20% solution in n-hexane, followed by addition of .011 mole of $VOCl_3$ (added as 10% solution in benzene), polymerization began at once as shown by the exotherm from 80° to 102° F. even though the system was set for maximum cooling. Additional ethylene and propylene were metered into the reactor continuously during the polymerization at a molar ratio of 1/1 and at a rate to maintain a constant reactor pressure. After twenty minutes an additional 30 g. of dicyclopentadiene was added. After 30 minutes .011 mole of pyridine N-oxide was added. The temperature again rose, from 93° to 111° F. The polymerization was stopped at 1 hour by cutting off the monomer flow and dumping the reaction mixture into 300 ml. of isopropanol containing 20 g. of 2,2'-methylene-bis(4-methyl-6-t-butylphenol) antioxidant to destroy the active catalyst and protect the polymer. The temperature at this point had dropped to 90° F. The terpolymer was precipitated by an excess of isopropanol, washed, and finally vacuum-dried; a yield of 1064 g. of terpolymer having an intrinsic viscosity of 0.78 in tetralin at 135° C. and a Mooney viscosity (ML–4) of 21 at 212° F. was obtained.

B. A blank run identical to the previous one, except that .005 mole of $VOCl_3$ was added instead of the pyridine N-oxide 30 minutes after the start of the polymerization reaction, gave 680 g. of polymer which had an intrinsic viscosity of 1.26 and a Mooney viscosity of 53 ML–4 at 212° F.).

EXAMPLE II

Use of hexane as solvent with premixed catalyst

A. In a run similar to Example 1–A except that 10 kilograms of commercial hexane were substituted for benzene, that the catalyst components were mixed before addition of the monomers, and that the pyridine N-oxide was added immediately after the monomers, the yield of terpolymer was 812 g., being completely soluble in tetralin and cyclohexane and of zero crystallinity. The intrinsic viscosity in tetralin at 135° C. was 1.7, and the Mooney viscosity was 77 (ML–4 at 212° F.).

B. A Comparison run from which the pyridine N-oxide was omitted gave a polymer which was partly insoluble (23% of very high molecular weight gel insoluble in cyclohexane). The Mooney viscosity was 94.5 (ML–4 at 212° F.), and the crystallinity was 1.8%.

EXAMPLE III

Hexane run in a 100-gallon reactor

A. Using a 100-gallon reactor with a loading of 100 kg. of hexane and with the other ingredients used in Example I–A increased proportionately and the catalyst ingredients used in Example I–A mixed in the presence of monomers, a 7148 g. yield of terpolymer was obtained $[\eta]^{135}=1.90$, and a Mooney viscosity (ML–4 at 212° F.) of 90. The temperature range was from 75° to 120° F.

B. A comparison run for the above, without the N-oxide, gave a polymer with an intrinsic viscosity of 2.71, and a Mooney viscosity (ML–4 at 212° F.) of 124. The exotherm was from 72 to 122° F. The catalyst efficiency was 349 g. of polymer per gram of $VOCl_3$ for this run; it was 375 g. per g. of $VOCl_3$ for III–A.

EXAMPLE IV

Seven hundred ml. of dry heptane were placed in a 3-necked, round-bottomed flask equipped with stirrer, condenser, thermometer, dropping funnel, and gas inlet and gas outlet tubes. The n-heptane was saturated for 10 minutes with 2 liters per minute each of ethylene and propylene (this flow continued during polymerization). To this was added 1.0 millimole of $Et_3Al_2Cl_3$ and 0.1 millimole of $VOCl_3$. (The temperature rose from 25.2° to 34° C. in the first minute.) Immediately the addition of 0.2 millimole of pyridine N-oxide, as 0.1-N solution in benzene was begun. The N-oxide solution was added dropwise throughout the course of the run (0 to 30 minutes). The temperature continued to rise to a maximum of 39.8° C. at seven minutes, then began to fall off slowly. After 30 minutes, 10 ml. of isopropanol and 20 ml. of 5% 2246 (antioxidant) solution were added. The polymer was flocced in a 50/50 methanol/acetone mixture (1000 ml.), chopped in a Waring Blendor, and dried in a vacuum oven. A slight amount of insoluble polymer was formed (0.25 g.) during polymerization and this was separated from the soluble portion (11.0 grams) prior to flocculation. I.V. (sol. portion, 135° C. in tetralin)=2.10. Percent ethylene to propylene ratio=65/35. For a similar run containing no pyridine N-oxide, 9.0 g. of soluble and 0.4 g. of insoluble polymer was obtained. The I.V. (135°) of the soluble portion was 3.88.

Thus it is seen that in every instance the presence of an amine N-oxide in the polymerization reaction system according to the invention results in the production of terpolymer rubber of markedly lower molecular weight than in the absence of amine oxide.

Having thus described our invention, what we claim and desire to protect by Letters Patent is:

1. In a method of solution interpolymerizing ethylene and propylene by means of a soluble catalyst comprising an alkylaluminum sesquichloride and vanadium oxytrichloride, the molar ratio of aluminum to vanadium being at least 5:1, the improvement comprising carrying out the said interpolymerization in the presence of an amine N-oxide to regulate the molecular weight of the interpolymer, the said amine N- oxide being selected from heterocyclic nitrogen base N-oxides, trialkylamine N-oxides, and dialkylarylamine N-oxides, the said N-oxide being present in amount of from 0.1 to 20 moles per mole of alkylaluminum sesquihalide.

2. A method as in claim 1 in which a copolymerizable non-conjugated diene is interpolymerized with the ethylene and propylene.

3. A method as in claim 1 in which the amine N-oxide is pyridine N-oxide.

4. A method as in claim 2 in which the diene is dicyclopentadiene.

5. A method as in claim 4 in which the amine N-oxide is pyridine N-oxide.

6. A method of interpolymerizing ethylene, propylene and a copolymerizable non-conjugated diene in solution in an inert organic solvent comprising introducing separately catalyst ingredients to said solvent containing at least a portion of the said monomers, said catalyst ingredients being alkylaluminum sesquihalide and vanadium oxytrichloride, the molar ratio of aluminum to vanadium being at least 5:1, to form a soluble catalyst in situ in the presence of the monomers, thereafter introducing an amine N-oxide which is soluble in said solvent, the amine N-oxide being selected from the group consisting of heterocyclic nitrogen base N-oxides, and the amount of amine N-oxide present being from 0.1 to 20 moles per mole of alkylaluminum sesquichloride, trialkylamine N-oxides, and dialkylarylamine N-oxides, whereby the said monomers interpolymerize to form an amorphous interpolymer of the said monomers in which the diene is randomly distributed, the molecular weight of the interpolymer being less than it would be in the absence of said amine N-oxide.

7. A method as in claim 6 in which the alkylaluminum sesquihalide is ethylaluminum sesquichloride, and the diene is dicyclopentadiene.

8. A method as in claim 6 in which the amine N-oxide is pyridine N-oxide.

9. A method as in claim 6 in which the mole ratio of aluminum to vanadium is from 5:1 to 50:1 and the amount of amine N-oxide is from 0.1 to 10 moles per mole of vanadium.

10. A method as in claim 9 in which the alkylaluminum sesquihalide is ethylaluminum sesquichloride, the diene is dicyclopentadiene, and the amine N-oxide is pyridine N-oxide.

References Cited

UNITED STATES PATENTS 3,000,866   9/1961   Tarney _____ 260—80
3,260,708   7/1966   Natta et al. _____ 260—80.5

FOREIGN PATENTS 628,896   8/1963   Belgium.

OTHER REFERENCES

Chemical Abstracts, 57, P13995 h, (1962).

JOSEPH L. SCHOFER, *Primary Examiner.*

R. BENJAMIN, *Assistant Examiner.*

UNITED STATES PATENT OFFICE
CERTIFICATE OF CORRECTION

Patent No. 3,405,107                                                                       October 8, 1968

Demetreos N. Matthews et al.

It is certified that error appears in the above identified patent and that said Letters Patent are hereby corrected as shown below:

Column 6, lines 25 to 27, cancel "and the amount of amine N-oxide present being from 0.1 to 20 moles per mole of alkylaluminum sesquichloride," and insert the same before "whereby" in line 28, same column 6.

Signed and sealed this 17th day of March 1970.

(SEAL)
Attest:

Edward M. Fletcher, Jr.                                 WILLIAM E. SCHUYLER, JR.
Attesting Officer                                                   Commissioner of Patents